United States Patent [19]

Sigerson et al.

[11] Patent Number: 4,715,965

[45] Date of Patent: Dec. 29, 1987

[54] METHOD FOR SEPARATING AND RECOVERING VOLATILIZABLE CONTAMINANTS FROM SOIL

[76] Inventors: Adam L. Sigerson, Box 9083 - R.D. 7, Sussex, N.J. 07461; James E. Shirk, 402 Fairmount Ave., Jersey City, N.J. 07306

[21] Appl. No.: 864,720

[22] Filed: May 19, 1986

[51] Int. Cl.⁴ .............................................. F26B 3/04
[52] U.S. Cl. ...................................... 210/800; 34/77; 34/79; 55/59; 55/74; 55/85; 55/97; 110/346; 134/25.1; 203/40; 203/41
[58] Field of Search .................... 34/77, 79; 55/59, 80, 55/85, 97, 228, 74; 110/215, 216, 234, 236, 246, 346; 134/25.1, 40; 203/39, 40, 41; 210/663, 664, 669, 691, 694, 747, 773, 774, 806, 800, 804, 776; 432/105, 111, 113

[56] References Cited

U.S. PATENT DOCUMENTS

| | | | |
|---|---|---|---|
| 3,744,221 | 7/1973 | Ross | 55/263 |
| 4,052,151 | 10/1977 | Reichrt et al. | 432/115 |
| 4,177,575 | 12/1979 | Brooks | 34/13 |
| 4,295,972 | 10/1981 | Kamei | 210/710 |
| 4,466,361 | 8/1984 | Henery et al. | 110/346 |
| 4,469,720 | 9/1984 | Morris | 34/79 |
| 4,494,967 | 1/1985 | Barth | 55/80 |
| 4,572,083 | 2/1986 | Griffith | 110/215 |
| 4,621,437 | 11/1986 | Grande et al. | 34/77 |

OTHER PUBLICATIONS

Webster, David M., "Enclosed Thermal Soil Aeration for Removal of Volatile Organic Contamination", Journal of the Air Pollution Control Assoc., vol. 36, No. 10 (Oct. 1986), pp. 1156-1163.

"Soil Aeration Pilot Study Work Plan", Canonie Engineers, Project CH 84-130, (Oct. 1985).

D. Hazaga, S. Fields and G. P. Clemons, "Thermal Treatment of Solvent Contaminated Soils," *Alternative Technology, 1984, pp. 404-406.*

Primary Examiner—Ivars Cintins
Attorney, Agent, or Firm—Kenyon & Kenyon

[57] ABSTRACT

A method for separating volatilizable contaminants from soil by introducing the soil into a rotary aggregate dryer through which a working gas indirectly heated to between 750° F. and 1800° F. is drawn to vaporize the contaminants, and for recovering the contaminants for environmentally sound disposal or recycling by downstream treatment of the effluent drawn off from the dryer. The downstream treatment includes cooling the effluent to condense and precipitate out a substantial portion of the contaminants and passing the effluent through activated carbon.

11 Claims, 1 Drawing Figure

METHOD FOR SEPARATING AND RECOVERING VOLATILIZABLE CONTAMINANTS FROM SOIL

BACKGROUND OF THE INVENTION (1) Field of the Invention

This invention relates to a method for separating volatilizable contaminants, such as chlorinated and non-chlorinated solvents and the lighter fractions of petroleum hydrocarbons, from soil, and for recovering the contaminants for recycling or environmentally sound ultimate disposal.

(2) Description of the Related Art

Historically, soils contaminated by solvents, oils and similar organic materials through leakage from storage or piping, accidental spills or inadequate disposal have been managed in several ways. Representative of the approaches which have been taken are: (1) excavation and reburial in an approved landfill; (2) soil flushing using recovery and recharge wells; and (3) in-situ biological treatment using supplemental nutrients and possibly supplemental bacteria.

These methods have not been entirely satisfactory for a host of technical, legal and cost reasons. Excavation and reburial of even moderate size tracts of contaminated soil is enormously costly. Moreover, even properly designed and operated state-of-the-art landfills have been found to leak. Soil flushing has serious technical limitations in that very large volumes of water must be flushed through the soil to sufficiently lower contaminant concentrations. In-situ biological treatment also possesses drawbacks, among them its unsuitability in areas with low groundwater and its high cost.

An alternative method of treatment for soils containing easily volatilized contaminants was attempted by the U.S. Environmental Protection Agency ("EPA") in 1984, as reported in an article by D. Hazaga, S. Fields and G. P. Clemons, entitled "Thermal Treatment of Solvent Contaminated Soils," *Alternative Technology*, 1984 pp. 404–06. The contaminated soil, containing 1,1,1 trichloroethane, trichloroethene, toluene, ethyl benzene and ortho-, meta-, and para-xylene in concentrations from 10,000 to 110,000 ppb., was fed through an asphalt drying unit, also known in the industry as an aggregate dryer or rotary kiln. The drying unit included a liquid propane burner at one end which supplied combustion gases at 375° F. to the interior of the dryer. From exposure to the 375° F. gas, the contaminants were vaporized and the combined mixture of gases passed through a cyclone and bag house for removing particulate emissions, and then discharged directly to the atmosphere. The treated soil was discharged from the dryer, collected and then returned to the site.

Although the foregoing method was reported to be effective in reducing the concentrations of some contaminants by at least 99%, serious drawbacks were evident. Volatile organic compounds ("VOC's") removed from the soil being treated were discharged to the atmosphere, thus decontaminating one medium, the soil, at the expense of polluting another medium, the air. In order to dilute the concentration of emitted VOC's in the ambient air, and because of local air discharge requirements, the dryer could only be operated at a feed rate of 10–15 tons of soil per hour, rather than the design rate of 100 tons/hour. Localities with more stringent air quality regulations would necessitate an even lower feed rate. Furthermore, the dryer could only be operated in dry weather conditions to prevent the emitted VOC's from being scrubbed from the atmosphere by rainfall, and thus returned to the soil.

In addition, in the EPA method, the interior of the dryer was not isolated from combustion of the burner fuel, and therefore the possiblity of ignition and partial combustion of flammable volatilized contaminants existed. In fact, combustion of the volatilized contaminants was assumed to have occurred in the dryer. Partial combustion of many common contaminants produces toxic intermediate species. Thus, the problem of pollutant discharge to the atmosphere is compounded in the EPA method by the possible discharge of toxic gases.

SUMMARY OF THE INVENTION

The present method for separating and recovering volatilizable contaminants from soil provides an effective thermal treatment alternative to landfilling and other conventional methods which is applicable to a broad range of contaminants and soil types, and which possesses none of the drawbacks of the prior art EPA method.

In the method of the invention, contaminated soil is introduced into a conventional rotary aggregate dryer having internal flighting for agitating the soil and advancing it through the dryer. The soil in the dryer is elevated in temperature by a hot working gas stream at a temperature of between 750° F. and 1800° F. The hot working gas is drawn through the dryer by an induced draft fan. The working gas is indirectly heated by use of a heat exchanger to avoid ignition and combustion of any flammable vaporized contaminants in the dryer. The working gas may be ambient air, or a gas or gas mixture which does not include oxygen and is not combustible. For present purposes, such a gas or gas mixture shall be referred to as an "inert gas." Nitrogen is the preferred inert gas for use in the method of the present invention.

Contaminant species are volatilized into the vapor phase by the increase in temperature and desorbed from the soil particles. The desorption of the contaminants is aided by the mechanical agitation produced by the dryer internal flighting and the high velocity passage of the working gas through the dryer. The vaporized contaminants mix with the working gas stream along with vaporized soil moisture and entrained soil particulate matter to form a gaseous effluent and are carried out of the dryer. The soil particulates are removed from the effluent in two filtration steps: passage through a cyclonic collector, followed by passage through a bag house. Decontaminated soil is discharged from the dryer for collection and returned to the site.

Rather than discharging the particulate-filtered effluent gas to the atmosphere, the effluent is further treated in two stages: a cooling stage and a carbon filter stage. In the cooling stage, the effluent, which leaves the bag house at temperatures of up to approximately 450° F., passes through an enclosure having a series of refrigerant coils which reduce the effluent temperature to not greater than 90° F. The reduction in temperature causes most of the vaporized contaminants to condense and precipitate out of the effluent gas stream along with a substantial portion of the vaporized soil moisture. The waste stream thus produced is piped away from the cooling stage and collected for safe ultimate disposal.

After leaving the cooling stage, the cooled effluent stream passes through activated carbon filters to capture any residual contaminants. Downstream of the carbon filters is the induced draft fan previously referred to, which draws the working gas into and through the dryer and the effluent out of the dryer and through the particulate filters, cooling stage and carbon filter stage. The cleansed effluent leaving the carbon filter stage, now consisting of essentially the working gas, is vented to the atmosphere if ambient air is used, or recycled to the heat exchanger if an inert gas is used.

Because the contaminants separated from the soil are recovered rather than discharged to the atmosphere, no crossmedia pollution is created, and soil feed rates through the dryer of 150 tons per hour or greater are possible. In addition, the absence of partial combustion within the dryer alleviates concern that toxic gases will be created in the drying stage which are not removable by the downstream filtration included in the present method.

Accordingly, it is an object of the present invention to provide a method for recovering, as well as separating, a wide range of volatilizable contaminants from a variety of soil types.

It is another object of the present invention to provide a method for separating and recovering volatilizable contaminants from soil which precludes any crossmedia pollution and escape of contaminants to the air, surface waters or groundwater.

It is a further object of the invention to provide a method for separating and recovering volatilizable contaminants from soil in which no combustion of the vaporized contaminants produced in the drying of the soil occurs.

It is a still further object of the invention to remove volatilizable contaminants from soil to enable the soil to be returned to the site of its origination.

These and other objects of the invention will be apparent to those skilled in the art from the following description of the preferred embodiment thereof in association with the accompanying drawing.

DESCRIPTION OF THE PREFERRED EMBODIMENT

Figure 1:
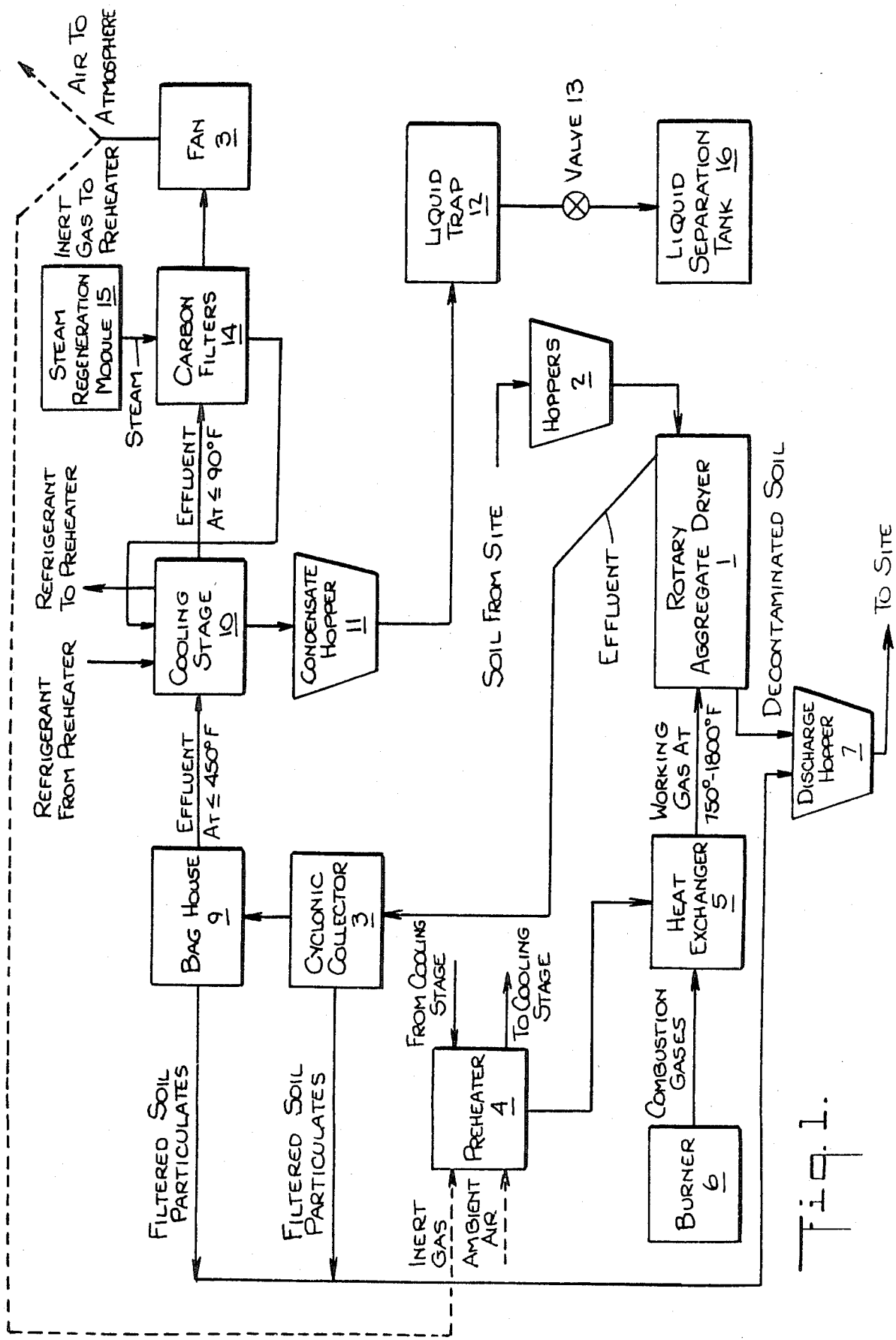
FIG. 1 is a flow diagram of the preferred embodiment of the method of the present invention.

FIG. 1 shows diagrammatically the flow of the soil from which the contaminants are to be separated, the working gas, the effluent produced in the vaporization of the soil contaminants, and the waste condensate streams in the method of the present invention. It should be understood that each of the items of apparatus employed is conventional equipment. Those of ordinary skill in the art will understand that variations in such apparatus are possible in the practice of the present method.

The invention utilizes a rotary aggregate dryer 1 of a size range common to the asphalt pavement industry, a suitable example being a McCarter type aggregate dryer or equivalent having a drum diameter of approximately 84 inches and a drum length of approximately 35 feet. The internal structure of the drum includes fixed and variable flighting to obtain high drying efficiencies under a broad range of operating conditions. The dryer also incorporates silicon-controlled rectifier based adjustable speed drives to vary drum speed in order to optimize the residence time within the dryer of the particular soil being treated.

Contaminated soil from a hazardous waste site is loaded into one or more feed hoppers 2 and conveyed from the hoppers into the dryer 1 by conventional enclosed conveying equipment such as screw conveyors. The hoppers 2 are provided with level controls to maintain adequate levels of soil during processing to assure a gas seal at the dryer inlet to prevent loss of the working gas or infiltration of fugitive ambient air. Contaminated soil is fed into the dryer at rates of between 25 and 150 tons per hour, with 100 to 150 tons per hour being preferred.

The soil within the dryer 1 is heated by a working gas stream at between 750° F. and 1800° F., flowing through the dryer at a preferable mass flow rate of between 100,000 and 160,000 pounds per 100 tons of soil fed through the dryer. The flow of working gas through the dryer and the downstream filtration stages hereinafter described is produced by an induced draft fan 3. The fan 3 is preferably a backward inclined type, preferably sized to produce a flow rate of 20,000 standard cubic feet per minute of air per 100 ton per hour throughput of contaminated soil in the dryer 1. The fan motor is supplied with a variable speed control unit to enable precise adjustment of fan speed to produce appropriate rates of flow of the working gas for a variety of soil types, moisture contents, and contaminant types and concentrations.

The working gas, which may be either ambient air or an inert gas, as previously described, is heated by being drawn into a preheater 4, and then ducted to a shell and tube gas-to-gas heat exchanger 5. Preheater 4 raises the temperature of the working gas to up to 300° F., and is supplied with waste heat from a source hereinafter described. Heat is supplied to the heat exchanger 5 by the combustion gases from a multifueled pressurized burner or steam-atomized pressurized burner 6 fired by propane, natural gas, fuel oil or a combination thereof at a combustion rate not in excess of 150 million BTU per hour. The combustion gases supplied to the heat exchanger 5 are vented to the atmosphere through a burner stack. The heat exchanger may be connected to the aggregate dryer by a suitable refractory lined duct, or integrally connected between the burner and dryer mounting to a refractory lined area internal to the dryer. All connections between the burner, heat exchanger, preheating section and dryer are sealed to prevent entry of fugitive air.

The working gas entering the aggregate dryer 5 may flow counter to the direction of flow of the soil, as indicated in FIG. 1, or in the same direction. The rapid passage of the heated working gas through the dryer and the mechanical agitation of the soil by the internal flighting of the dryer causes the contaminant species to be volatilized into the vapor phase, and carried by the working gas out of the dryer. At the same time, a substantial portion of the moisture in the soil is also vaporized and drawn out of the dryer along with entrained particulate matter from the soil. The decontaminated soil is discharged from the dryer by suitable enclosed conveying equipment to a hopper 7 having spray bars for applying a fine spray of water to the discharged soil in order to remoisten the soil for return to the site and minimize dust.

The effluent mixture of the working gas, vaporized contaminants, soil moisture, and soil particulates leaves the dryer at a temperature of between approximately 250° F. and 500° F. The effluent is then drawn by fan 3 through a series of filtration stages. The first filtration stage involves the removal of soil particulates, and utilizes primary and secondary particulate collection equipment. The primary collector comprises a cyclonic collector 8, and is followed by a pulsed jet bag house 9, sized to obtain a maximum 6:1 air to cloth ratio and preferably utilizing Nomex bag material or its equivalent. The soil particulates removed by the cyclonic collector 8 and bag house 9 are conveyed to soil discharge hopper 7.

The particulate-free effluent then passes through a cooling stage 10 consisting of an enclosure surrounding a series of conventional refrigerant coils, entrance and exit ducting and piping for condensate discharge. The waste heat transferred from the effluent to the refrigerant medium supplied to the coils, which will raise the temperature of the refrigerant medium to approximately 300° F., is supplied to preheater 4 by passing the refrigerant medium through suitable radiant heat transfer elements contained in preheater 4, as indicated in FIG. 1. Use of the waste heat of the effluent in this manner increases the overall efficiency of the process, thus reducing its cost.

As an alternative, the waste heat removed from the effluent in the cooling stage may be used to heat the ambient air drawn upon by burner 6 to promote combustion. The use of such heated air reduces the fuel requirement needed to supply the heat exchanger with combustion gases of adequate heating value.

The size of the cooling stage 10 is selected to accommodate effluent produced by soil containing 10% moisture and fed through the dryer at a nominal rate of 100 tons per hour. The discharge of effluent exceeding the design capacity of the cooling stage can be mediated by controlling soil flow rate through the dryer. The cooling stage reduces the temperature of the effluent, which may enter the condenser at a temperature of up to 450° F., to 90° F. or less for subsequent carbon filtration.

The reduction in temperature of the effluent will cause eighty to ninety percent of the vaporized contaminants and soil moisture to condense and precipitate out of the effluent, forming a first liquid waste stream. The first waste stream is collected in a hopper 11 and then piped to a liquid trap 12 having an automatic valve 13 which is normally closed to preclude any escape of gaseous effluent. When the valve 13 is opened, waste collected in trap 12 will be drained into a liquid separation tank 16, where the condensed contaminants and water are collected for separation into organic and aqueous phases before final disposal.

After passage through cooling stage 10, the effluent is drawn by fan 3 through three ninety square foot, two to five foot deep regenerable activated carbon filtering units 14 for removal of substantially the remaining vaporized contaminants from the effluent, leaving a clean gas stream flowing to fan 3.

Carbon filters 14 are connected to a steam regeneration module 15 having a steam production rate of approximately 8,000 pounds per hour. During a carbon regeneration cycle, steam produced by module 15 is directed through carbon filters 14 in order to remove the accumulated contaminants from them. The contaminated steam is then directed through cooling stage 10, which includes suitable mechanical seals at the inlet and outlet through which the working gas effluent is drawn by fan 3 during operation of the dryer 1. These seals are closed during carbon regeneration to isolate the cooling stage 10 and prevent the escape of contaminated steam. The cooling of the contaminated steam causes it to condense and form a second liquid waste stream. The second liquid waste stream passes into hopper 11 and then is directed into liquid trap 12. During a carbon regeneration cycle, valve 13 is opened to permit the accumulated liquid waste in trap 12 to flow into liquid separation tank 16. After carbon regenration is completed, valve 13 is closed and the cooling stage inlet and outlet seals are reopened to again permit flow through of effluent.

After separation of the organic and aqueous liquid phases in the liquid separation tank 16, the organic phase liquids may be shipped off site for disposal by incineration at a qualified facility. If the organic phase liquid is a single species of contaminant, recycling of the material may be possible. Aqueous phase liquids are also transported off site for treatment by a qualified facility.

The cleansed effluent, which consists essentially of the working gas, is discharged by fan 3 to the atmosphere, if ambient air is used as the working gas, or recycled back to preheater 4 if an inert gas is used as the working gas. In either case, cross-media pollution of the air, and of the soil caused by the removal of effluents from the air by rainfall, is avoided.

The method of the invention will separate and recover from soil from 90% to over 99% of contaminants such as chlorinated and non-chlorinated solvents and the lighter fractions of petroleum hydrocarbons. These encompass VOC's with boiling points below 500° F., all common solvents, straight chain (i.e., aliphatic) hydrocarbons through C-14, single ring aromatic hydrocarbons through C-12, and double ring aromatic hydrocarbons through C-11. Treatable soils include silts, sandy and silty clays, sandy and silty clay loams, loams, sandy and silty loams, sands, and silty and loamy sands. Most soil contamination problems involving volatizable contaminants are thus amenable to treatment with the present invention.

What is claimed is:

1. A method for separating and recovering volatilizable contaminants from soil comprising the steps of:
   introducing the soil into a rotating aggregate dryer;
   indirectly heating a working gas to a temperature of between 750° F. and 1800° F. by passing said working gas through a heat exchanger;
   volatilizing said contaminants and the moisture in the soil by passing said heated working gas through said dryer, whereby said working gas, said volatilized contaminants and moisture, and entrained soil particulates form an effluent;
   drawing off said effluent from said dryer;
   filtering said entrained soil particulates from said effluent;
   subsequently condensing a substantial portion of said volatilized contaminants and moisture from said effluent to form a first liquid waste stream by cooling said effluent;
   collecting said first liquid waste stream;
   after condensing a substantial portion of said volatilized contaminants and moisture from said effluent, passing said effluent through activated carbon to remove substantially the remaining volatilized contaminants from said effluent; and
   after volatilizing said contaminants and moisture in the soil in said dryer, discharging said soil from said dryer.

2. A method in accordance with claim 1 wherein said working gas is ambient air, and wherein, after removing substantially the remaining volatilized contaminants from said effluent, said method further comprises the step of:

discharging said effluent to the atmosphere.

3. A method in accordance with claim 1 wherein said working gas is an inert gas, and wherein, after passing said effluent through activated carbon, said method further comprises the step of:

recycling said effluent to said heat exchanger.

4. A method in accordance with claim 1 wherein said cooling of said effluent is accomplished by transferring heat to a refrigerant medium, and wherein said method further comprises the step of:

prior to passing said working gas through a heat exchanger, preheating said working gas by withdrawing said transferred heat from said refrigerant medium.

5. A method in accordance with claim 4 wherein the temperature of said effluent in said condensing step is reduced to not greater than 90° F.

6. A method in accordance with claim 5 wherein said working gas is preheated to a temperature of up to 300° F.

7. A method in accordance with claim 1 wherein, after passing said effluent through activated carbon, said method further comprises the steps of:

removing accumulated contaminants from said activated carbon by directing steam therethrough;

condensing said steam by cooling said steam to form with said removed contaminants a second liquid waste stream; and collecting said second liquid waste stream.

8. A method in accordance with claim 7 wherein, after the steps of collecting said first and second liquid waste streams, said method further comprises:

separating organic and aqueous phase liquids from said collected first and second liquid waste streams.

9. A method in accordance with claim 8 wherein said step of filtering said entrained particulates from said effluent includes:

(i) passing said effluent through a cyclonic collector; and (ii) passing said effluent through a bag house.

10. A method in accordance with claim 9 wherein said soil is introduced into said dryer at a rate of from 25 to 150 tons per hour.

11. A method in accordance with claim 10 wherein said working gas is passed through said dryer at a mass flow rate of between 100,000 and 160,000 lbs. per one hundred tons of soil fed into said dryer.

* * * * *